(12) United States Patent  (10) Patent No.: US 9,182,138 B2
Foreman et al.  (45) Date of Patent: Nov. 10, 2015

(54) METHOD AND APPARATUS FOR ATTIC FAN POWER CONTROLLER WITH REMOTE CONTROL

(75) Inventors: Geoffrey H Foreman, Incline Village, NV (US); Robert J Buckley, Incline Village, NV (US)

(73) Assignee: AIR VENT, INC., Buffalo, NY (US)

( * ) Notice: Subject to any disclaimer, the term of this patent is extended or adjusted under 35 U.S.C. 154(b) by 470 days.

(21) Appl. No.: 13/184,334

(22) Filed: Jul. 15, 2011

(65) Prior Publication Data

US 2012/0015597 A1  Jan. 19, 2012

Related U.S. Application Data

(60) Provisional application No. 61/364,967, filed on Jul. 16, 2010.

(51) Int. Cl.
   *F24F 7/06*   (2006.01)
   *F24F 11/00*  (2006.01)
   *F24F 7/007*  (2006.01)
   *F24F 5/00*   (2006.01)

(52) U.S. Cl.
   CPC ............. *F24F 11/0001* (2013.01); *F24F 7/007* (2013.01); *F24F 11/0012* (2013.01); *F24F 11/0015* (2013.01); *F24F 2005/0067* (2013.01); *F24F 2011/0068* (2013.01)

(58) Field of Classification Search
   USPC ......... 454/239, 251, 341, 343, 900; 236/49.3; 307/31
   See application file for complete search history.

(56) References Cited

U.S. PATENT DOCUMENTS

| 4,040,042 A |   | 8/1977  | Mayer |
| 4,432,273 A | * | 2/1984  | Devitt ........................... 454/343 |
| 4,544,910 A | * | 10/1985 | Hoberman ..................... 340/333 |
| 4,663,539 A | * | 5/1987  | Sharp et al. ..................... 307/38 |
| 4,939,986 A | * | 7/1990  | Turner .......................... 454/347 |
| 4,947,928 A | * | 8/1990  | Parker et al. .................. 165/208 |
| 5,233,227 A |   | 8/1993  | Kajimoto et al. |
| 5,620,368 A |   | 4/1997  | Bates et al. |
| 5,909,061 A | * | 6/1999  | Sasaki et al. .................... 307/44 |
| 5,977,659 A | * | 11/1999 | Takehara et al. ................ 307/85 |
| 6,098,175 A | * | 8/2000  | Lee ............................... 713/320 |
| 6,220,956 B1 |  | 4/2001  | Kilian et al. |
| 6,290,593 B1 | * | 9/2001 | Weissbrich et al. ............. 454/75 |
| 6,734,800 B1 |  | 5/2004  | Laieski |
| 7,006,898 B2 | * | 2/2006 | Barbir et al. .................. 700/286 |
| 7,143,597 B2 | * | 12/2006 | Hyland et al. .................. 62/236 |
| 7,540,262 B2 | * | 6/2009 | Kuelbs .......................... 119/452 |
| 7,567,844 B2 | * | 7/2009 | Thomas et al. ................. 700/19 |
| 7,746,604 B2 | * | 6/2010 | McNally et al. ................ 361/42 |
| 7,758,408 B2 |  | 7/2010  | Hagentoft |
| 7,850,513 B1 | * | 12/2010 | Parker et al. .................. 454/228 |
| 8,100,341 B1 | * | 1/2012 | Roderick et al. ............. 236/49.3 |
| 8,123,142 B2 | * | 2/2012 | Cislo ........................... 236/49.3 |
| 8,608,533 B2 | * | 12/2013 | Daniels ........................ 454/250 |

(Continued)

OTHER PUBLICATIONS http://www.thisoldhouse.com/toh/video/0,,20047003,00.html.*

*Primary Examiner* — Steven B McAllister
*Assistant Examiner* — Frances F Hamilton
(74) *Attorney, Agent, or Firm* — Duane Morris LLP

(57) ABSTRACT

A method and apparatus for attic fan power controller with remote control have been disclosed. In one version a solar array and/or a power line source provides energy for a fan determined by a control box which also interfaces with a remote control.

19 Claims, 14 Drawing Sheets

(56) References Cited

U.S. PATENT DOCUMENTS

| | | | |
|---|---|---|---|
| 2004/0038642 A1 | 2/2004 | Gatley | |
| 2004/0050380 A1* | 3/2004 | Abe et al. | 126/572 |
| 2005/0191957 A1* | 9/2005 | Demetry et al. | 454/341 |
| 2006/0149422 A1* | 7/2006 | Dunstan et al. | 700/276 |
| 2006/0286922 A1* | 12/2006 | Roux et al. | 454/239 |
| 2007/0114291 A1 | 5/2007 | Pouchak | |
| 2007/0119958 A1* | 5/2007 | Kates | 236/1 B |
| 2007/0209653 A1* | 9/2007 | Beisheim et al. | 126/80 |
| 2007/0243820 A1* | 10/2007 | O'Hagin | 454/365 |
| 2007/0275651 A1 | 11/2007 | Palmer | |
| 2008/0074259 A1* | 3/2008 | Houston | 340/556 |
| 2008/0113612 A1* | 5/2008 | Chich et al. | 454/341 |
| 2008/0121729 A1 | 5/2008 | Gray | |
| 2008/0277486 A1* | 11/2008 | Seem et al. | 236/49.3 |
| 2009/0013703 A1* | 1/2009 | Werner | 62/180 |
| 2009/0065595 A1* | 3/2009 | Kates | 236/49.3 |
| 2009/0076658 A1* | 3/2009 | Kinnis | 700/277 |
| 2009/0096399 A1* | 4/2009 | Chen et al. | 318/441 |
| 2009/0117843 A1* | 5/2009 | Palmer et al. | 454/239 |
| 2009/0140057 A1* | 6/2009 | Leen | 236/49.3 |
| 2009/0140058 A1* | 6/2009 | Koster et al. | 236/49.3 |
| 2009/0140061 A1 | 6/2009 | Schultz et al. | |
| 2009/0140064 A1* | 6/2009 | Schultz et al. | 236/51 |
| 2009/0143916 A1* | 6/2009 | Boll et al. | 700/276 |
| 2009/0179495 A1* | 7/2009 | Yeh | 307/66 |
| 2009/0203308 A1 | 8/2009 | O'Hagin et al. | |
| 2009/0215375 A1* | 8/2009 | Hagensen | 454/42 |
| 2010/0009724 A1* | 1/2010 | Fischer | 455/573 |
| 2010/0034677 A1* | 2/2010 | Uselton | 417/423.1 |
| 2010/0038966 A1* | 2/2010 | Espeut, Jr. | 307/68 |
| 2010/0044449 A1* | 2/2010 | Tessier | 236/94 |
| 2010/0078492 A1 | 4/2010 | Cislo | |
| 2010/0107076 A1* | 4/2010 | Grohman et al. | 715/709 |
| 2010/0207951 A1* | 8/2010 | Plaisted et al. | 345/473 |
| 2010/0245103 A1* | 9/2010 | Plaisted et al. | 340/657 |
| 2010/0291850 A1* | 11/2010 | Sabbaghian et al. | 454/61 |
| 2010/0304660 A1* | 12/2010 | Boehling et al. | 454/343 |
| 2011/0109164 A1* | 5/2011 | Mohammed Suhura et al. | 307/66 |
| 2011/0151761 A1* | 6/2011 | Lesle et al. | 454/75 |
| 2011/0217184 A1* | 9/2011 | Hipp | 417/44.1 |
| 2011/0223850 A1* | 9/2011 | Narayanamurthy et al. | 454/239 |
| 2012/0046792 A1* | 2/2012 | Secor | 700/276 |
| 2012/0059527 A1* | 3/2012 | Beaston et al. | 700/295 |
| 2013/0099760 A1* | 4/2013 | Shizuya et al. | 323/271 |
| 2014/0123381 A1* | 5/2014 | Stephens | 4/507 |

\* cited by examiner

METHOD AND APPARATUS FOR ATTIC FAN POWER CONTROLLER WITH REMOTE CONTROL

RELATED APPLICATION

The present Application for Patent is related to U.S. Patent Application No. 61/364,967 entitled "Method and Apparatus for Attic Fan Power Controller with Remote Control" filed Jul. 16, 2010, and is hereby incorporated herein by reference.

FIELD OF THE INVENTION

The present invention pertains to fans. More particularly, the present invention relates to a method and apparatus for attic fan power controller with remote control.

BACKGROUND OF THE INVENTION

Fans are used to move air and for many situations provide some degree of assistance in cooling humans or structures. A source of power that is becoming more favored is solar. However, due to the limited power provided by solar, traditional attic fans may not be able to run when needed, for example, in cloudy conditions, or at night. This presents a problem.

Additionally, an attic fan may run when not needed. This presents a problem.

BRIEF DESCRIPTION OF THE DRAWINGS

The invention is illustrated by way of example and not limitation in the figures of the accompanying drawings in which:

FIG. 2 is a block diagram of a computer system which some embodiments of the invention may employ parts of.

DETAILED DESCRIPTION

A method and apparatus for attic fan power controller with remote control is disclosed.

In one embodiment of the invention a control box (also denoted as a black box) enables an attic fan to run on both solar power and house electricity (power line) and performs seamless integration of both power sources for continuous operation.

In one embodiment of the invention the black box is an intelligent power distributor equipped with temperature and humidity sensors.

In one embodiment of the invention the black box can be custom-set for various weather conditions through a wireless remote control.

In one approach an apparatus using a tiltable and rotatable solar panel, a wall supply and a fan are controlled by the black box taking into account temperature and humidity. These and other embodiments of the present invention are described in the writings and drawings herewith.

In one embodiment of the invention the solar panel may provide power to the black box. In one embodiment of the invention the black box may be controlled by a remote control. In one embodiment of the invention, the remote control may be via a computer which may be connected to a network.

In one embodiment the invention may be tailored to an attic exhaust fan use.

Figure 3:
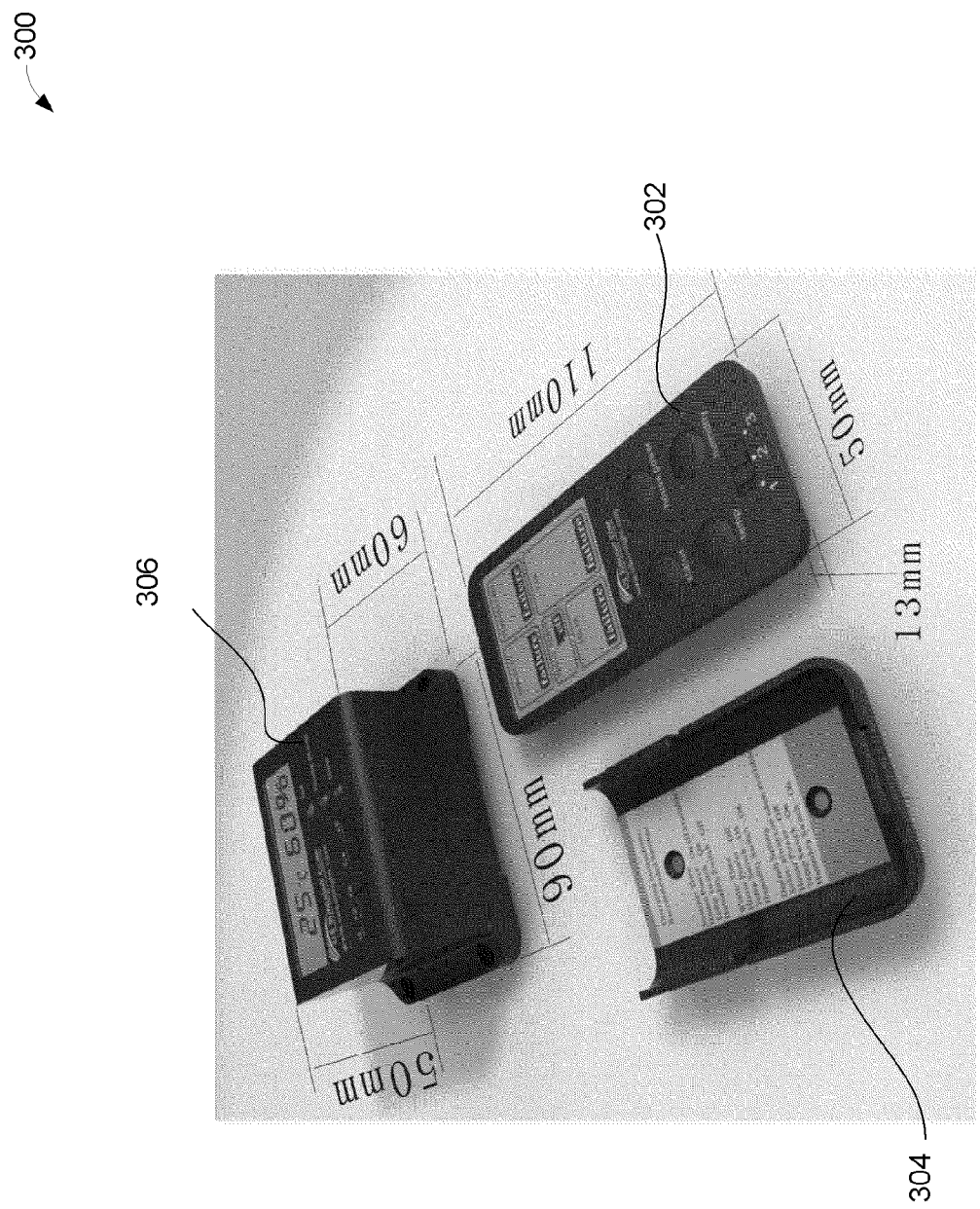
FIG. 3 illustrates a remote control, a holder for a remote control and a control box.

FIG. 3 illustrates, generally at 300, one embodiment of the invention showing various parts. 302 is a remote control, 304 a holder for the remote control (e.g. to mount on a wall), and 306 is a black box (also called a control box).

Figure 4:
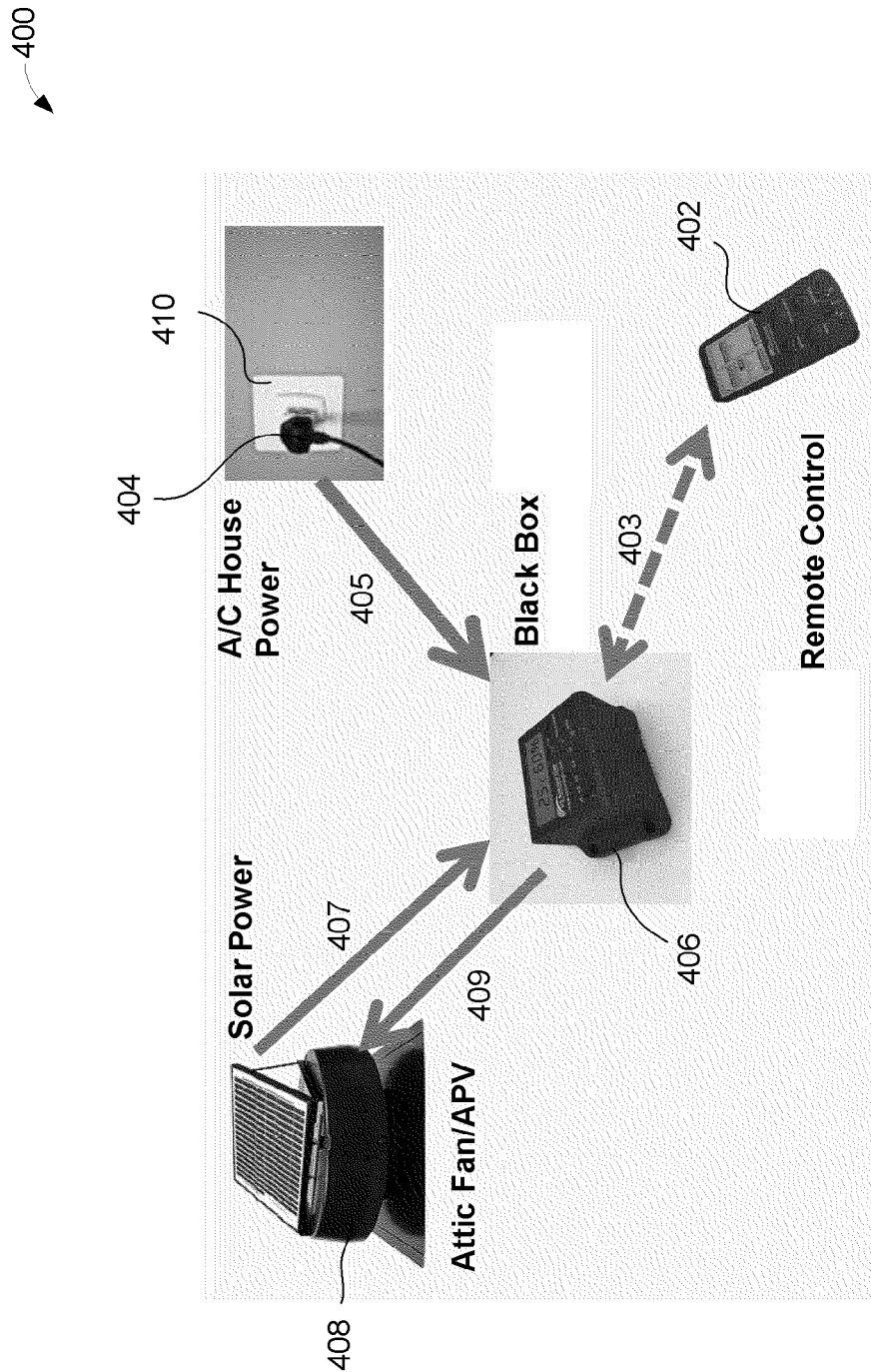
FIG. 4 illustrates an embodiment of a system for controlling a fan.

FIG. 4 illustrates, generally at 400, one embodiment of the invention showing a system control view. At 402 is a remote control that can communicate via pathway 403 with the black box 406. Pathway 403 may be wireless (e.g. 402 is a RF (radio frequency) remote control). Black box 406 receives NC (also denoted AC) (alternating current) via pathway 405 from a power adapter 404 connected to an outlet 410. The black box 406 may be mounted near the attic fan (also called Attic Fan/APV) 408. The black box 406 is in communication with the attic fan 408 via pathway 407 which may be a source of solar power, and in communication with the attic fan 408 via pathway 409 which may be a source of power supplied from power adapter 404. Pathway 407 and 409, in one embodiment of the invention may be the same pathway.

Figure 5A:
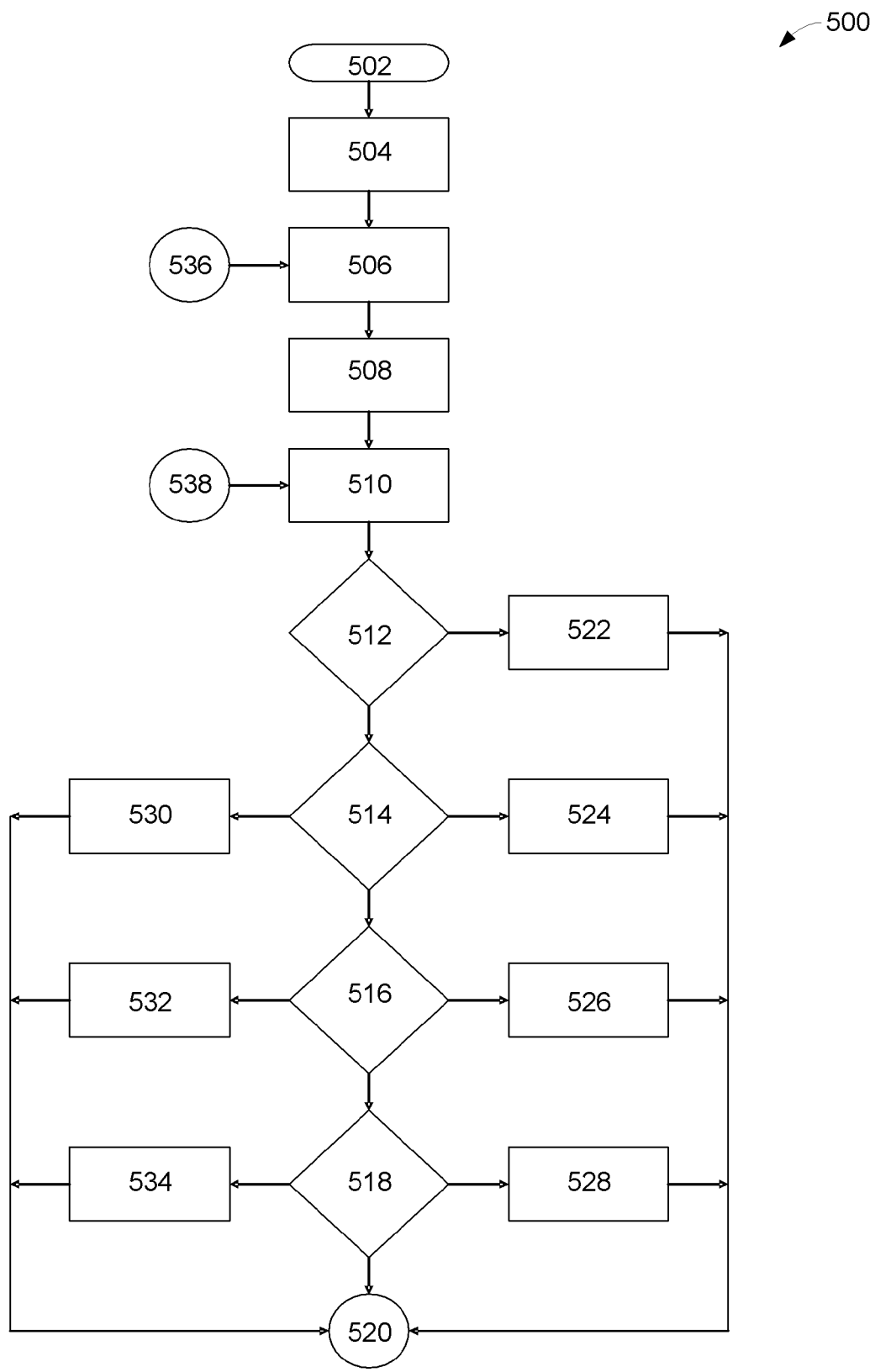
FIGS. 5A-5C illustrate embodiments of the operation of the system.
Figure 5B:
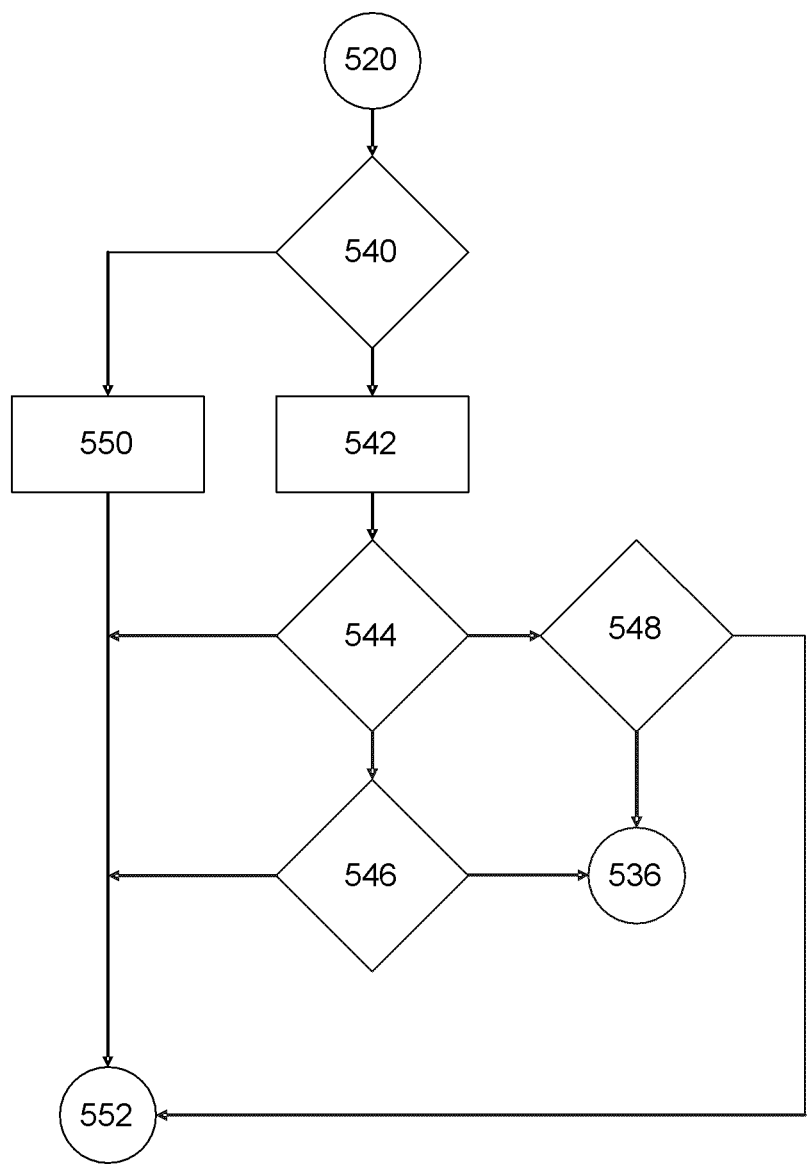
Figure 5C:
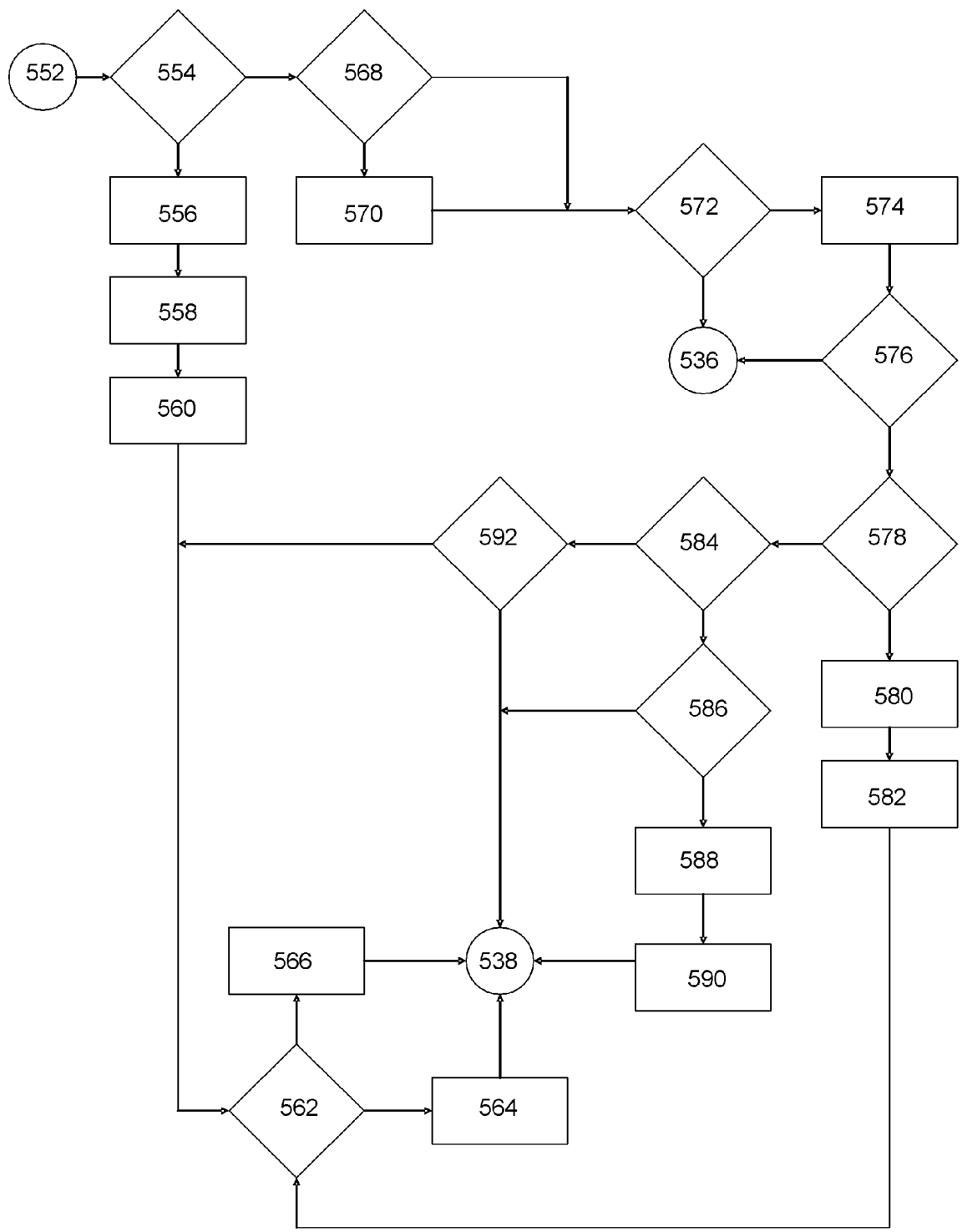
Figure 6:
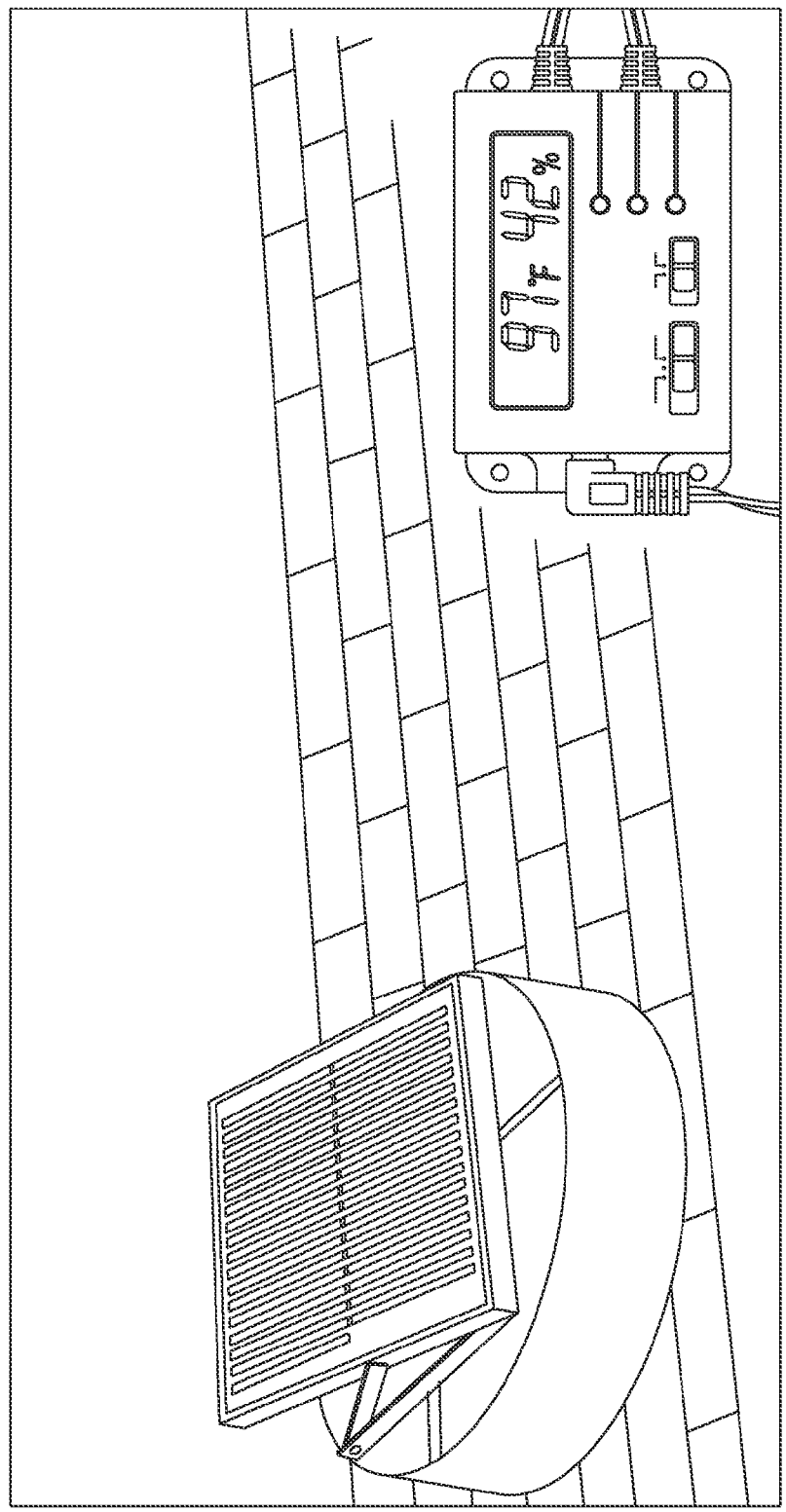
FIG. 6 illustrates an installed fan, solar panel and control box according to various embodiments.
Figure 7:
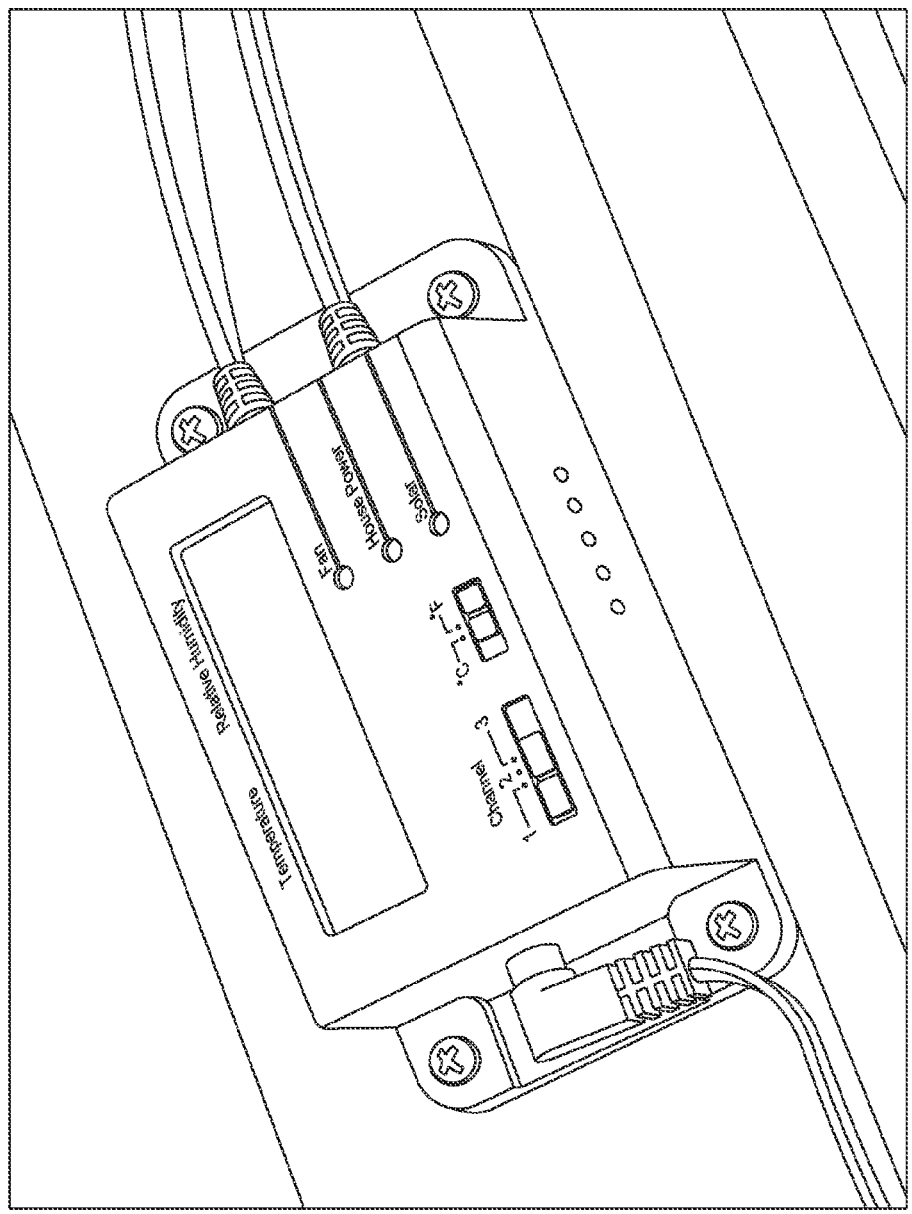
FIGS. 7, 8 and 12 illustrate an embodiment of the control box.
Figure 8:
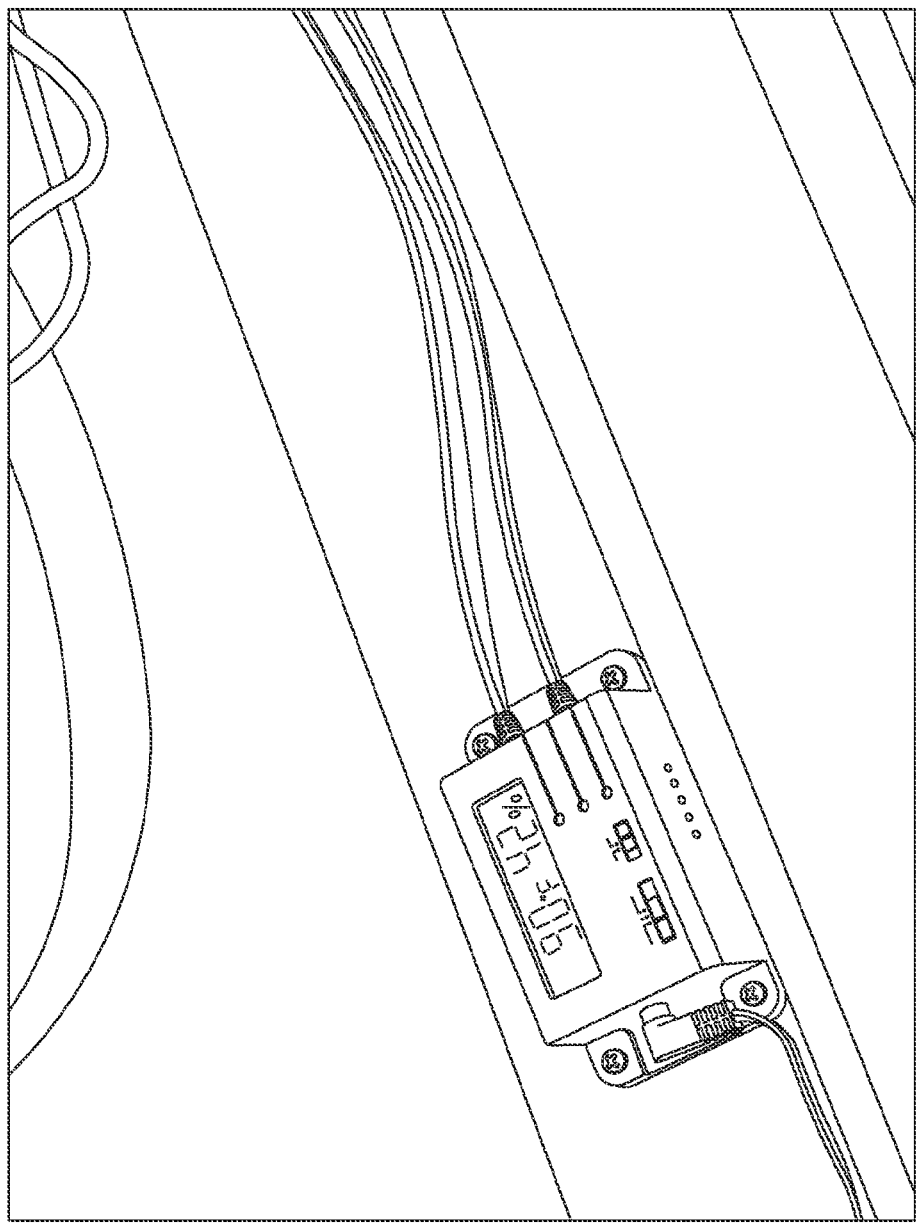

FIG. 5A, FIG. 5B, and FIG. 5C illustrate, generally at 500, spanning FIG. 5A, FIG. 5B, and FIG. 5C, one embodiment of the invention showing in flowchart form an embodiment of the invention. A multitude of steps are shown, however one of skill in the art will appreciate that many of the steps are of an optional or implementation specific nature. For example, if an embodiment of the invention does not have a humidity sensor then the flowchart paths dealing with humidity are optional. FIG. 5A, FIG. 5B, and FIG. 5C are intended to illustrate a rather complete implementation, however, the invention is not so limited and as discussed many of the steps are optional, thus many variations are possible.

Described herein is one possible embodiment as illustrated in FIG. 5A, FIG. 5B, and FIG. 5C. At 502 is power on. At 504 is a humidity and/or temperature setting on. At 506 is a solar LED (light emitting diode) and/or AC LED off. At 508 is a fan and/or fan LED off. At 510 is a receive remote control signal from 538. At 512 is a check for status command and if status commend is yes then to 522 transmit status and if status commend is no then to 514 to check house power command, and if house power command is on then to 524 to set house power on, and if house power command is off then to 530 to set house power off, and if house power command is no then to 516 to check for a humidity command. If at 516 humidity command is on then to 526 to set humidity setting on. If at 516 humidity command is off then to 532 to set humidity setting off. If at 516 humidity command is no then to 518 to check for a temperature command. If at 518 temperature command is on then to 528 to set temperature setting on. If at 518 temperature command is off then to 534 to set temperature setting off. If at 518 temperature command is no then to 520. At 520 then to 540 to check for a humidity or temperature sensor failure, and if yes then to 550 to set a sensor failure, and if humidity or temperature sensor failure is no then to 542 to display humidity and temperature. At 544 a check is made to see if humidity and temperature setting is on, and if temperature setting is on then to 548 to check if the temperature is greater than 80 deg F. (degrees Fahrenheit), and if humidity setting is on then to 546 to check if humidity is greater than 75% (percent). If at 548 the temperature is greater than 80 deg F. then proceed to 552. If at 548 the temperature is not greater than 80 deg F. then proceed to 536. If at 546 the humidity is greater than 75% (percent) then proceed to 552. If at 546 the humidity is not greater than 75% (percent) then proceed to 536. From 552 proceed to 554 to check to see if solar power is available (e.g. check current), and if solar power is available proceed to 556 to power the fan by solar, and if solar power is not available proceed to 568 to check if there has been no power continuously for 30 days. If at 568 it is determined that there has been no solar power for 30 days continuous then at 570 set solar failure alert and proceed to 572. At 558 disable a timer associated with keeping track of the days as in 568. At 560 turn AC LED off and turn solar LED on. At 562 check for a fan failure, and if a fan failure then at 566 set fan failure indication and proceed to 538. If at 562 there is no fan failure then at 564 set fan and/or fan LED on and then proceed to 538. At 572 check to see if house power is enabled, and if house power is not enabled then proceed to 536, and if house power is enabled then at 574 power the fan by using house power. At 576 a check is made to see if the house power has been on for 8 times within 4 hours and if yes then proceed to 536, and if no then proceed to 578. At 578 a check is made to see if this the first time entering house power, and if yes then proceed to 580 and enable a timer, and if no then proceed to 584. At 582 set the solar LED indicator to off and set the AC LED to on. At 578 a check is made to see if the fan is on or off, and if the fan is on then proceed to 586, and if the fan is off then proceed to 592. At 592 a check is made to see if the fan has been off for at least 22 minutes, and if so then proceed to 562, and if the fan has not been off for at least 22 minutes then proceed to 538. At 586 a check is made to see if the fan has been turned on for 8 minutes, and if so then proceed to 588, and if the fan has not been turned on for 8 minutes then proceed to 538. At 588 a counter is incremented by 1 to count within a four hour time period as used in 576. At 590 turn the fan and/or fan LED off.

While the illustration above has used specific numbers (e.g. 80 deg F., 75%, etc.) the invention is not so limited and any temperature and humidity numbers may be used in embodiments of the invention as well as the number of days to check for lack of solar power, the minutes running within a time period, etc.

Described herein is one possible embodiment as illustrated in FIG. 5A, FIG. 5B, and FIG. 5C. At 502 the method is entered. At 504 turn on solar array power to fan. At 506 measure fan voltage. At 508 measure fan current. At 510 calculate fan power consumption. At 512 determine if >1 W (Watt) power, and if so then at 522 set power>1 W indicator, if not then at 514 determine if power>0.1 W and if yes then at 524 set power 0.1-1 W indicator, and if not then at 516 check to see if the fan is turning an if so then at 526 set fan on indicator, and if not then at 532 set fan off indicator. (N.B. some steps are not used as explained above and optional (e.g. 530, 534, 528 not used so far.) From 520 we go to 540 the check if fan speed>10 RPM (revolutions per minute), and if so then at 550 set fan OK (okay) indicator and proceed to 552, otherwise at 542 connect AC based power source to fan and at 544 check for speed of fan>10 RPM and if so then proceed to 552, otherwise at 548 check to see if AC power source is still connected and if not then proceed to 536 else proceed to 552. From 552 proceed to 554 where we check to see of the AC power and solar power are on and if so then at 556 disconnect solar power, and if not then at 568 check for fan speed>10 RPM and if yes then proceed to 572, and if not then at 570 set slow fan indicator then proceed to 572. At 572 check to see if fan speed>5 RPM, and if yes then proceed to 536, and if not then at 574 increase power to the fan supplied from the AC source. Then at 576 unconditionally proceed to 536 (i.e. regardless of decision proceed to 536). At 562 check to see if the fan speed is greater than when solar power and AC powered source are on, and if no then at 564 indicate that solar is okay, and if not then at 566 indicate that solar array is defective.

While the illustration above has used specific numbers (e.g. 10 RPM, 1 W, etc.) the invention is not so limited and any numbers may be used in embodiments of the invention.

Additionally, other embodiments of the invention can turn power to the fan off and measure wind speed, measure fan RPM by pulsing power on and off, and provide for a fixed fan speed by combining solar and AC supplied power as needed.

Additionally, other embodiments where the black box is controlled by a computer directly, or via a computer via the remote control can provide for advanced control of the attic fan based on factors other than solar, temperature, and humidity, for example, but not limited to time of day, time of season, anticipated cloud cover, inside temperatures, noise levels, wind speeds, etc.

The black box is also referred to as the control box or solar controller or Solar Controller since it is capable of controlling the solar power input and/or house electrical input.

In one embodiment of the invention it is not necessary to connect house electricity to the Solar Controller. The Solar Controller will be powered by the solar panel when sunlight is available. When sunlight is not available and with no connection to house electricity, the Solar Controller will not function. Attic temperature and humidity will not be monitored. As soon as sunlight is available the fan, remote and functions of the Solar Controller will operate, including monitoring humidly, temperature as well as the monitoring functions.

In one embodiment of the invention the current status of the fan and attic temperature can be determined. Click the "Status" button on the remote, to display the following information:

Attic Temperature
Attic Humidity
Fan status—ON, OFF, or Intermittent (during a house electricity cycle)

Note that the above info will only be available when Solar Controller is powered by sunlight or house electricity. The remote readout will not work when there is no power to the Solar Controller.

In one embodiment of the invention the remote does not continue receiving information from the fan. That is, the remote will only gather information when the status switch is selected and there is power going to the control box. If the control box is connected to house power then the remote will display the current condition of the Solar Attic Fan when the status button is selected. If the fan is not connected to the house power and there is no sun powering the Solar Attic Fan then the remote will display nothing when the status button is selected. In one embodiment the remote will power off in 20 seconds to conserve power. If you need additional information you will need to select the status button again to retrieve the most current information.

In one embodiment of the invention the RF channel on the Solar Controller must match the RF channel set on the remote control to communicate.

In one embodiment of the invention to display attic temperature in C to F you may select the desired unit on the Solar Controller itself.

In one embodiment of the invention the remote control has a thermo switch. The Thermo Switch is located at the back of the remote control. Switch to the OFF position to disable temperature sensor. When the Thermo Switch is disabled (i.e. OFF) then the fan will run anytime there is power available.

In one embodiment of the invention the humidity sensor (aka humidstat) can't be disabled. The humidistat is by default ON all times to monitor the attic humidity, and turns the fan on when relative humidity reaches 75%. The fan will be turned off when relative humidity drops below 65%. If the Thermal Switch is enabled the fan will only turn on when the temperature is higher than 80 degrees F. and/or the humidity is higher than 75%. If you disable the Thermal Switch the fan will run anytime there is available power.

In one embodiment of the invention using house power does not add significant cost to the electric bill. The Solar Controller is uniquely optimized to run the least amount of time possible using the least amount of electricity possible. Since the ambient temperature is continually dropping after the sun sets, the fan only needs to run in short intervals and since it uses a DC powered motor, the amount of actual energy drain is minimal. The additional electricity required will likely cost less than $5 per year.

In one embodiment of the invention house electricity is optional. The Solar Controller and remote controller will work when solar is available and the control box will monitor the humidity and temperature of the attic as well as the status of the fan. In order to run the fan after the sun goes down you will need to connect the control box to house power.

In one embodiment of the invention the installation of the solar controller is as simple as connecting two wires and plugging the control box into a power source.

In one embodiment of the invention the Solar Controller has Dual Mode Technology. Power your fan after dark. The addition of the Solar Controller with Dual Mode Technology will enable your Solar Powered Attic Fan to run after sunset or when there is no light available from the sun. When there is no sunlight available to power the fan and the Solar Controller has the optional house power connection enabled, the Solar Controller will cycle house electricity for 8 minutes every half-hour in order to power the fan. This will allow your attic temperature to continue to drop after sunset and help remove the hot, stagnant air that can build up on those warm summer evenings.

In one embodiment of the invention the Solar Controller is a perfect replacement for electric fans. The Solar Controller allows you to power your fan with free, abundant solar power when you need it most while also giving you the option to run your fan after sunset using only a small amount of house electricity—all without the noise and operating expense of an outdated, traditional, electric attic fan.

In one embodiment of the invention Real-time status updates are available. The remote control readout on the Solar Controller sends a radio signal through your walls and ceiling to give you a real-time status update on fan operation to let you know if your fan is running and if the power source is from the solar panel or the house electricity. There is no more questioning if your fan is running! This industry-first advancement will give you the peace of mind that your fan is functioning and your attic is being ventilated.

In one embodiment of the invention attic temperature and humidity are displayed. The remote control unit will also display the current attic temperature and relative humidity. Simply press the STATUS button and the information is transmitted from the Solar Controller to your hand-held remote.

In one embodiment of the invention the Solar Controller is uniquely optimized to run the least amount of time possible; using the least amount of electricity possible. Since the ambient temperature continues to drop after sunset, the fan only needs to run in short intervals. And since it uses a DC powered motor, the amount of actual energy drain is minimal. The additional electricity required will cost less than $5 per year.

In one embodiment of the invention a temperature sensor monitors the attic temperature and will turn on the fan when the temperature reaches 80 degrees and will turn off the fan when the temperature dips below 77 degrees. This allows the fan to only run when it is necessary to vent hot air from the attic space, extending the life of the motor. The unit comes with the temperature switch disengaged. It is recommended that the temperature switch remain disengaged to enable year-round venting. However, you may engage the temperature switch if desired.

In one embodiment of the invention there is a humidistat. Too much humidity in the attic can cause condensation which can lead to the growth of mold and mildew. The built-in humidistat monitors the attic humidity and will turn the fan on if the attic air reaches 75% relative humidity and will turn it off at 65% relative humidity.

Figure 12:
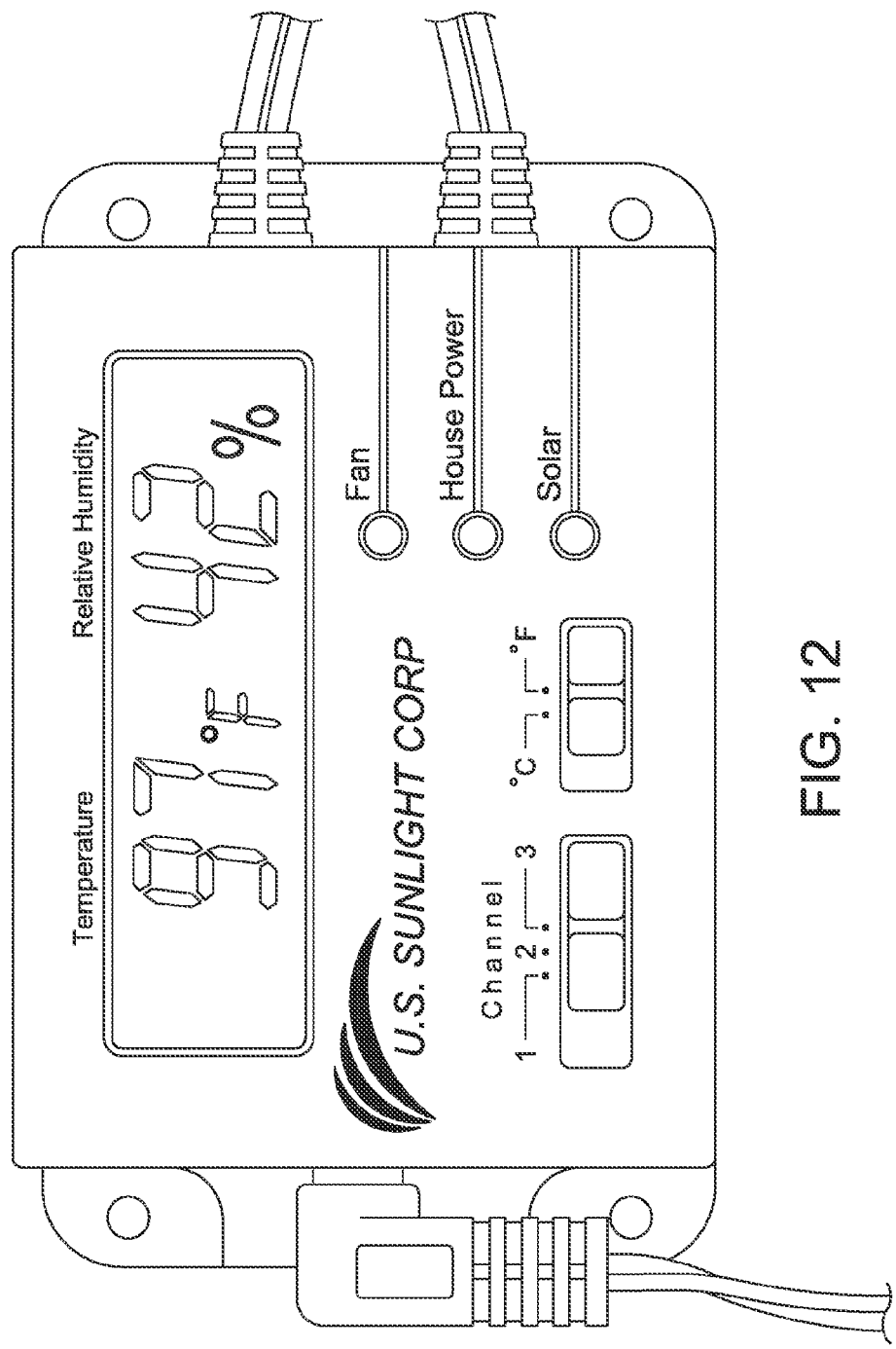

FIGS. 6-12 illustrate various embodiments of the invention. Showing for example, but not limited to, overview (FIG. 6), control box (FIG. 7), control box connections (FIG. 8), mounted control box and fan (FIG. 9), remote control (FIG. 10), remote control front and back (FIG. 11), and up close view of control box (FIG. 12).

Thus a method and apparatus for attic fan power controller with remote control have been described.

Figure 1:
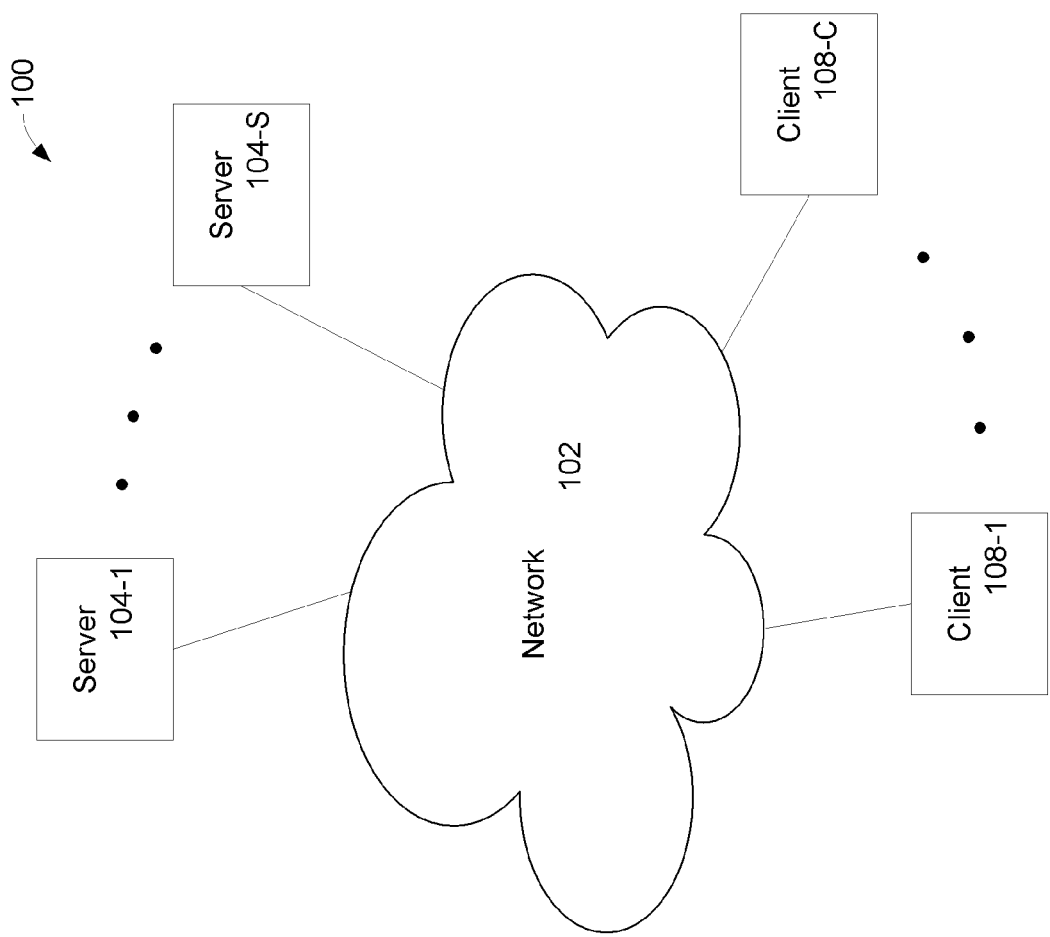
FIG. 1 illustrates a network environment in which the method and apparatus of the invention may be controlled.

FIG. 1 illustrates a network environment 100 from which the techniques described may be controlled. The network environment 100 has a network 102 that connects S servers 104-1 through 104-S, and C clients 108-1 through 108-C. More details are described below.

Figure 2:
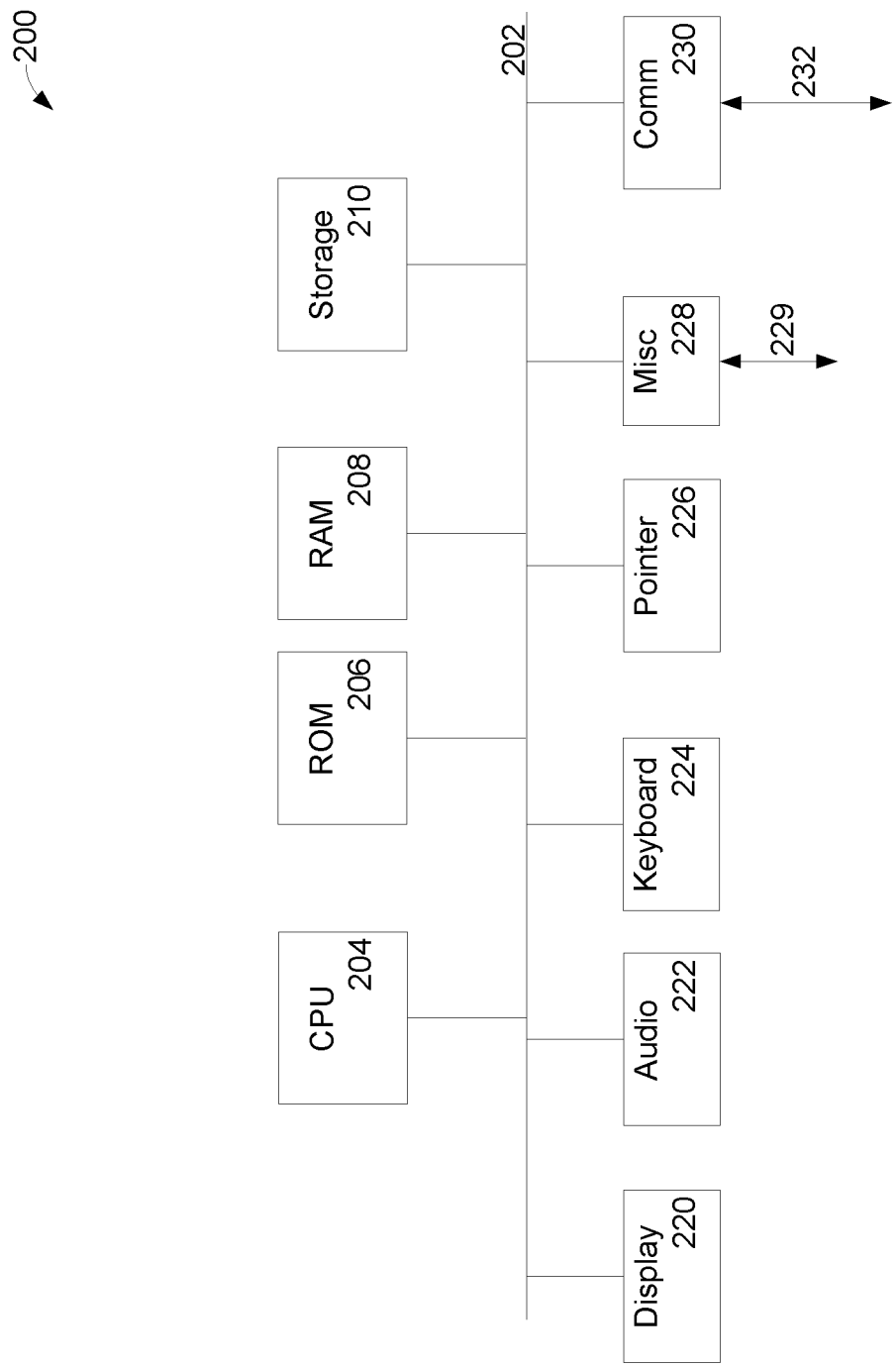

FIG. 2 is a block diagram of a computer system 200 which some embodiments of the invention may employ parts of and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be controlled. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be controlled by essentially any type of communicating means or device whether local or remote, such as a LAN, a WAN, a system bus, etc. For example, a network connection which communicates via for example wireless may control an embodiment of the invention having a wireless communications device. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228 via link 229, and communications 230 via port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a non-transitory computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of non-transitory media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any non-transitory mechanism for storing or transmitting information in a form readable by a machine (e.g., a computer). For example, a non-transitory machine-readable medium includes read only memory (ROM); random access memory (RAM); magnetic disk storage media; optical storage media; flash memory devices; devices having non-transitory storage.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for attic fan power controller with remote control have been described.

In embodiments, hybrid-technology optimizes solar or house electricity sources to maximize fan operation while conserving energy. This extends the solar fan run-time into the evening with the solar controller. With the solar controller, the solar powered attic fan can continue to run into the evening to further reduce the attic temperature. Plugging in the AC Adapter allows the solar controller to use house electricity to optimize fan performance at a minimum cost of operation, for example less than $5 per year.

In embodiments, the solar controller monitors both temperature and humidity, optimizing the fan's operation for maximum performance in all weather conditions. The solar controller intelligently limits the amount of electricity used to power the fan, so it is a perfect alternative to traditional electric powered vents. With the built-in temperature and humidity sensors, the solar controller can monitor attic conditions and utilize solar power or house electricity to optimize the run-time of the fan by either removing the excessive heat or moisture.

| Power Consumption | 1Q10TR | 1Q10TR with the Solar Controller |
|---|---|---|
| Day time (11 a.m.-6 p.m.) | 0 | 0 |
| Evening time (6 p.m.-12 a.m.) | 0 | 0.029 kWH(8 mins every 30 mins) |
| Total Power Consumption | 0 | 0.029 kWH |
| Hrs. of Ventilation | 7 hrs. | 13 hrs. |
| Monthly Energy Cost ($0.20/kWH) | $0 | $0.17 |
| Yearly Energy Cost | $0 | $2.04 |

In embodiments, the system provides a perfect replacement for noisy AC powered vents. The solar controller allows for operation with free abundant solar power when it is needed most while also giving the option to run the fan after sunset using only a small amount of house electricity, all without the noise and operating expense of an outdated traditional electric attic fan. The fan can be run after dark to remove the hot, stagnant air that can build up on hot summer evenings. The status of the fan can be monitored to know if the fan is running and if the power source is from solar or electric power. The temperature and humidity can be monitored in real-time by simply pressing a button. Further, intelligently simple attic ventilation is programmed to optimize the attic can for all weather conditions.

In embodiments, a complete kit includes the following components: controller box; remote; AC adapter; wall mounted holster; wiring harness; and mounting hardware. The remote control displays attic temperature, humidity and fan status. The thermo switch selector on the back of the remote control enables or disables the thermo switch.

In embodiments, a temperature sensor monitors attic temperature and will turn on the fan when the temperature reaches 80 degrees and turns off the fan when the temperature dips below 77 degrees. This allows the fan to only run when it is necessary to vent hot air from the attic space. A built-in humidistat monitors attic humidity and will turn on the fan if the attic air reaches 75% relative humidity and will turn it off at 65% relative humidity. Too much humidity in the attic can cause condensation on the surfaces which can lead to the growth of mold and mildew. The controller box houses the device logic, RF receiver/transmitter, humidistat and thermo switch.

Setting up of the solar controller and remote will now be described. First, connect the AC power adapter to the controller box. Temperature and relative humidity will be displayed. Second, the controller box has two slide switches, the one on the left is for selecting the radio frequency (RF) channel and the one on the right is for selecting the temperature readout in Celsius (° C.) or Fahrenheit (° F.). Align the RF channel (choice of 1, 2 and 3) of the remote with the controller box. Both of them must be on the same channel in order to send and receive signals. Select the desired temperature readout unit. Third, remove the back panel of the remote. Insert two AAA batteries in the battery compartment. Replace the back panel of the battery compartment. Finally, test the remote by pressing the status button once. This will establish the connection between the controller box and remote. You will hear a "beep" every time the status button is pressed. This verifies the remote and controller box RF signals are aligned. If there is not a beep, check that the RF channel selector is set to the same channel. If there is still no beep, move both devices to an alternative channel and retry.

Installation of the system will now be described. If the solar controller comes bundled with an attic fan, install the fan first. When the installation of the fan is complete, then install the solar controller. The solar controller can be installed with or without the use of house electricity. When implementing the standard installation, the solar controller will run only on power generated by the solar panel and will provide these functions: (1) Reads attic temperature and relative humidity and displays them on the controller box and remote; (2) Monitors fan and solar panel working conditions; and (3) Allows user to enable or disable thermo switch on the remote. These functions will be active only when the sun is available to generate electricity from the solar panel. Installing the solar controller with the AC power adapter will provide these additional benefits: (4) Extends fan operation into the evening hours; (5) Allows fan to operate when no sun is available; and (6) Intelligently limits the amount of house electricity to be used for adequate ventilation.

Figure 9:
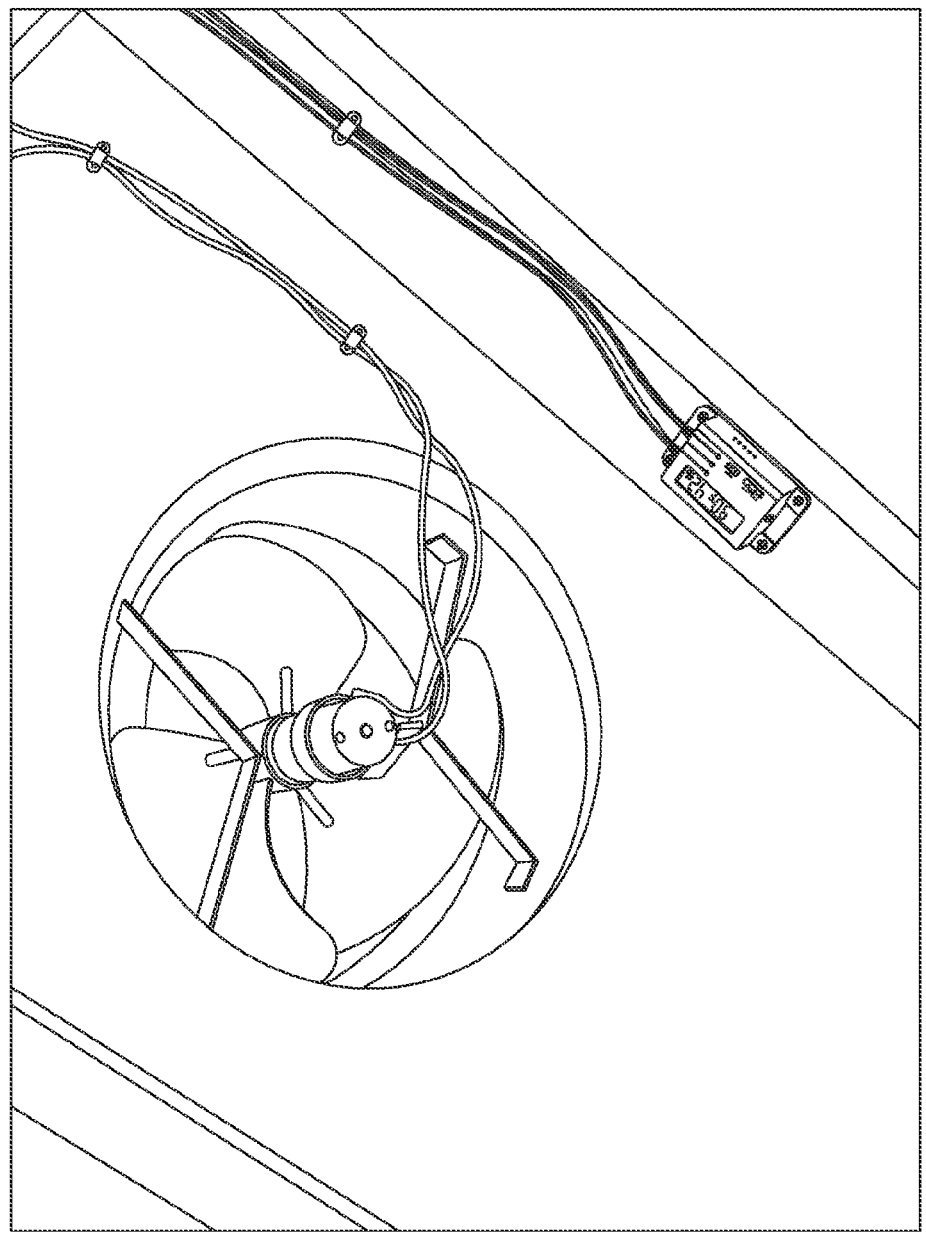
FIG. 9 illustrates the underside of the roof of a structure, with the control box installed and connected to a fan.
Figure 10:
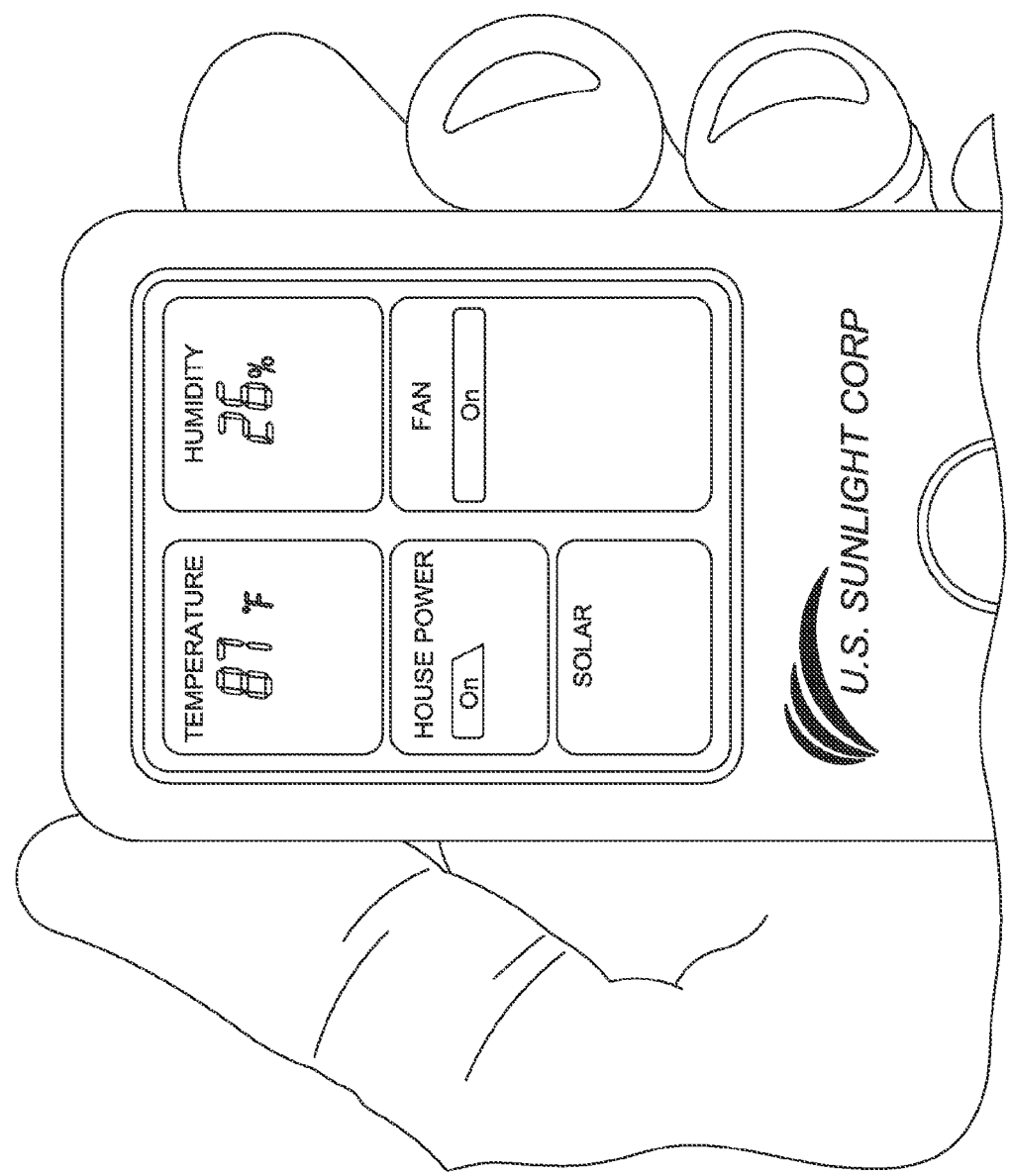
FIG. 10 illustrates an embodiment of a remote control.
Figure 11:
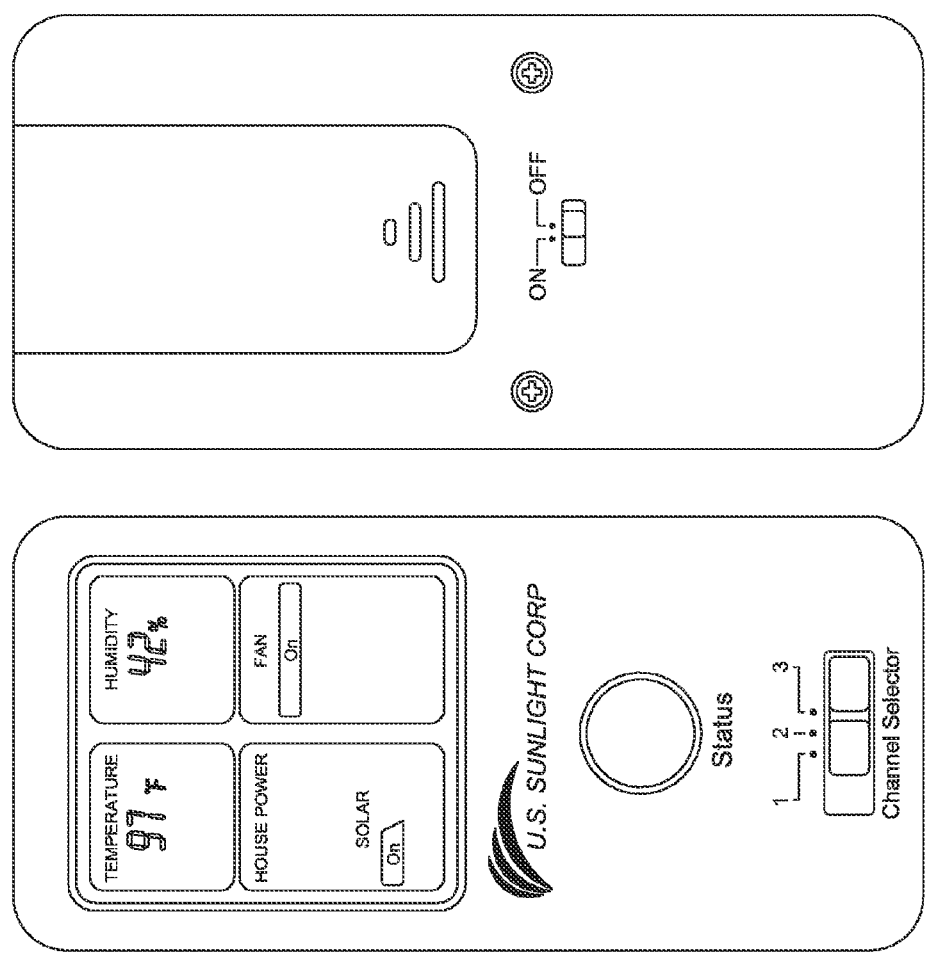
FIG. 11 illustrates front and rear view of the remote control of FIG. 10.

The following steps can be performed for a standard installation. First, bring the complete solar controller kit, including the remote and controller box, to the attic. Second, check and make sure the thermo switch on the back of the remote is set to the OFF position. Third, install the controller box on a nearby rafter close to the underside of the roof with the provided mounting screws. The controller box has vents on either side of the housing that allow the temperature and humidity sensors to work, so it is important to locate the controller box with at least 1 inch of space between it and the underside of the roof. For best results, locate the controller box near the fan opening as shown in FIG. 9. Mounting within 2 to 3 feet of the motor is recommended. Fourth, unplug the 2 wire leads (red and black) from the motor. If the fan came with a thermal switch, unplug the wire coming in from the solar panel to the switch. The controller box will replace the function of this switch. Fifth, take one 8' cable and plug the female leads into the motor (red to red and black to black) and connect the male leads to the fan connectors on the controller box. It is important to connect the controller box to the motor before connecting to the solar panel. Sixth, take the another 8' cable and connect the female leads to the solar connectors on the controller box (red to red and black to black) and connect the male leads into the female leads coming from the solar panel. The fan will begin running as soon as sun hits the solar panel so it is important to keep fingers clear of the fan blades. Seventh, the cable connectors have been designed to prevent incorrect connection, so it should be confirmed that the red wires are connected to the red wires and the black wires to the black wires. Eighth, provided there is sunlight to the solar panel, the LCD display is now activated and will read the current attic temperature and relative humidity. When the solar controller logic detects the fan in operation, the fan and solar LEDs will light up accordingly. This will take approximately 30 seconds. Ninth, press the status button on the remote to activate solar controller. The fan should be running now if solar power is available. Press the status button again to update the fan's operation status. Tenth, use tie wraps and ¼" or ½" coaxial staples, available from most local hardware store or builders' supply, to secure the wiring harness to the rafter. The solar controller is now installed and running with power generated by the solar panel.

The following steps can be performed for installation with use of optional house electricity. To utilize the house electricity option with solar controller, connect the controller box to an AC outlet with the AC power adapter. The AC Power Adapter works on a standard 110V outlet. First, steps 1-10 of the standard installation should be completed. Second, temporarily disconnect wiring to the solar connectors at the controller box. Third, the AC power adapter comes with 4.5 ft. of cord. Verify the power source (outlet) is located within that distance. Fourth, connect the AC power adapter to the house power/DC 12V port on the controller box. Fifth, plug the AC Power Adapter into the power source (outlet). The controller box will display attic temperature and relative humidity in a few seconds. Sixth, press the status button on the remote to activate the solar controller. The fan will be running now. Press the status button again to update the operation status. Seventh, if necessary, use ¼" or ½" coaxial staples to secure the wire to the rafter. Eighth, reconnect the wiring in step 2 to the solar connectors of the controller box. The solar controller will now utilize the solar panel and house electricity to optimize fan operation.

Details of the remote control are now provided. The remote has one status button on the front below the LCD display, and a thermo switch selector on the back. The channel setting is provided on the front of the remote. There are 3 available RF channels. Select the same RF channel for the controller box and remote. The RF channel ID must match the controller box and remote in order to have information available. The status button is also provided on the front of the remote. When the status button is pressed, a beep will sound from the controller box to signify a proper connection between the controller box and remote. The remote's LCD display will show the following information: attic temperature; attic relative humidity; fan mode (ON, OFF, INTERMITTENT or FAILURE); house power (ON); and solar power (ON). The status will be displayed for approximately 20 seconds. Pressing the status button again will refresh the information after 20 seconds. Note that it is important to make sure the RF channel is the same between the controller box and remote. If there is no beep sound after pressing the status button, no connection has been made with the controller box and the LCD display will go blank. Check the following if there is no display on the remote after pressing the Status button: (1) Batteries have been installed. Replace if necessary; (2) RF channel is properly aligned between the controller box and remote; (3) solar controller wire connections are correct; and (4) AC power adapter is connected to the solar controller for after dark operation.

The back for the remote has the thermo switch selector, which can be in the ON or OFF positions. The thermo switch allows the user to engage or disengage the temperature control. It is recommended that the thermo switch be set to ON in warm climates and to OFF in cold climates where sustained below freezing temperatures may occur. When the thermo switch is set to ON, the fan will only be turned on when attic temperature reaches 80° F. and power is available. Once on, the fan will stop when temperature drops below 77° F. When the thermo switch is set to OFF mode, the fan will be turned on when power is available, regardless of attic temperature. After making a change to the thermo switch on the remote, (1) click the status button to send the command to the solar controller, (2) wait 5 seconds for the solar controller to change the fan operation, and (3) click the status button again to read the current fan operation status. In embodiments, the humidity control is always enabled. That is, the relative humidity sensor is always enabled and the user cannot disable the sensor. The fan will be turned on when attic relative humidity reaches 75%, regardless of attic temperature. The fan will turn off when relative attic humidity drops to 65%.

Further details regarding the power source are now provided. Whenever available, solar power is the default power source. On a typical day with proper sunlight, the fan will operate until sunset. If solar power is not available, the fan will not operate unless the solar controller is installed with the AC power adapter connected to house electricity. The fan will continue operation in the following pre-set mode for 6 hours: (i) ON for 8 minutes and OFF for 22 minutes in a 30-minute period. This is the most effective air circulation frequency to keep the attic temperature close to the outside temperature; (ii) The fan will run for a maximum of 6 hours on intermittent house electricity; (iii) The fan will run on solar power whenever solar power becomes available again; and (iv) After 6 hours of running on intermittent house electricity, the fan will be turned off for up to 12 hours, then turned back on, assuming solar power is not available during this period of time. In summary:

| Primary Power Source | Solar Fan with Solar Controller WITHOUT AC Adapter connected | Solar Fan with Solar Controller WITH AC Adapter connected |
|---|---|---|
| Daytime - with sufficient solar power | Solar power | Solar power |
| Evening after sunset | No power available | Intermittent house electricity for 6 hours |

Note that the primary power source is always solar. If solar power is not available during the daytime, the primary power source will switch to house electricity (if the controller box is connected to house electricity) for up to 6 hours or until solar power becomes available.

A summary of how to interpret the LCD display and the fan's operating status is provided below:

| House Power | Solar Power | Fan | Operation Summary |
|---|---|---|---|
| (Blank) | ON | ON | Solar power is available<br>Fan is running |
| (Blank) | ON | OFF | Solar power is available<br>Fan is not running<br>Attic Temperature is <80° F.<br>Thermo Switch could be ON<br>To run fan, switch Thermo Switch to OFF then press the Status button twice |
| ON | (Blank) | ON-Intermittent | Solar power is not available<br>Fan is powered by house electricity<br>Fan is running intermittently, currently in the 8-min ON mode of the 6-hour cycle |
| ON | (Blank) | Intermittent | Solar power is not available<br>Fan is powered by house electricity<br>Fan is running intermittently, currently in the 22-min OFF mode of the 6-hour cycle |
| ON | (Blank) | OFF | Solar power is not available<br>Fan is powered by house electricity<br>Fan is in the 12-hour OFF mode<br>Fan will restart when solar power becomes available, or at the end of the 12-hour OFF mode |
| (Blank) | ON | Failure | House electricity is available<br>Fan is not running<br>Possible problems<br>Loose wiring<br>Motor Failure<br>Solar Controller Failure |
| ON | (Blank) | Failure | Solar power is available<br>Fan is not running<br>Possible problems<br>Loose wiring<br>Motor Failure<br>Solar Controller Failure |

A description of the use of a multiple fan set up with 3 or less fans is now provided. Assign one of the three available channels to each of the solar controllers. A beep sound will come from the controller box that is communicating with the remote. Each paired set of a controller box and remote should be set to different RF channels. Therefore, each pair will have the controller box and remote set to the same RF channel but be different than the other controller boxes and remotes installed in the same attic. Do not assign the same RF channel to 2 or more solar controllers. The user can use the same remote to control all 3 fans (if applicable) by selecting the correct RF channel.

Embodiments of an apparatus for controlling a fan are disclosed. The apparatus comprises a controller having a plurality of signal inputs, a plurality of signal outputs, a plurality of power inputs, and a plurality of power outputs; a display unit in communication with said controller; a plurality of switches in communication with said controller; and a plurality of light indicators in communications with said controller, wherein a first one of said plurality of light indicators indicates a status of said fan.

In embodiments, the apparatus comprises a temperature sensor connected to said controller through a first set of said signal inputs.

In embodiments, the apparatus of claim further comprises a humidity sensor connected to said controller through a second set of said signal inputs.

In embodiments of the apparatus, a first set of said plurality of power inputs is connected to a local solar array.

In embodiments of the apparatus, a second one of said plurality of light indicators indicates a status of said local solar array.

In embodiments of the apparatus, a first set of said plurality of power outputs is connected to said fan.

In embodiments of the apparatus, a first set of said plurality of switches selects a temperature scale for said display unit.

In embodiments of the apparatus, a second set of said plurality of switches selects a radio frequency channel.

In embodiments of the apparatus, a second set of said plurality of power inputs is connected to a local power supply, said power supply plugged into an electrical outlet.

In embodiments of the apparatus, a third one of said plurality of light indicators indicates a status of said local power supply.

Embodiments of a method are disclosed. The method comprises receiving power from a local power source; sensing a local temperature; displaying said local temperature on a display; sensing a local humidity; displaying said local humidity on said display; controlling a fan based on said local temperature and said local humidity; lighting a fan indicator to indicate said fan is being controlled; and lighting one or more indicators to indicate said local power source.

In embodiments of the method, said local power source is a solar panel.

In embodiments of the method, said local power source is an electrical outlet.

In embodiments of the method, said local power source is a solar panel and an electrical outlet.

In embodiments of the method, the method further comprises checking a speed of said fan, and turning said fan off if said speed of said fan is not within a pre-specified range.

In embodiments of the method, the method further comprises measuring a power consumed by said fan, and turning said fan off if said power consumed by said fan is not within a pre-specified range.

In embodiments of the method, the method further comprises communicating to a remote control unit said local temperature and said local humidity when a user presses a status button.

In embodiments of the method, the method further comprises communicating to said remote control unit said local power source selected from the group consisting of said solar panel, said electrical outlet, said solar panel and said electrical outlet, and not said solar panel and not said electrical outlet.

In embodiments of the method, the method further comprises communicating to said remote control unit a fan status selected from the group consisting of on, off, intermittent, and failure.

In embodiments of the method, the method further comprises communicating from said remote control unit when a user activates a switch selected from the group consisting of a status, and a temperature control.

What is claimed is:

1. An apparatus for controlling an attic exhaust fan comprising:
   a controller having a plurality of signal inputs, a plurality of power inputs, and a power output;
   a display unit in communication with said controller;
   a plurality of user-triggerable switches in communication with said controller; and
   a plurality of light indicators in communication with said controller, wherein a first one of said plurality of light indicators indicates a status of said attic exhaust fan,
   wherein the plurality of power inputs includes a first power input for connecting to a local solar array and a second power input for connecting to a local public utility AC power supply,
   wherein the controller is configured to operate the attic exhaust fan based on sensed input signals at the plurality of signal inputs,
   wherein the controller is configured to provide power to the power output from the first power input as a default if a predetermined amount of power for operating the attic exhaust fan is provided at the first power input and provide power to the power output from the second power input if a predetermined amount of power for operating the attic exhaust fan is not provided at the first power input,
   wherein when the controller operates the attic exhaust fan based on the sensed inputs:
      the controller is configured to operate the attic exhaust fan continuously when power is being provided from the first power input to the power output, and
      the controller is configured to operate the attic exhaust fan for a predetermined duty cycle and for a total period not to exceed a predetermined duration when power is being provided from the second power input to the power output;
   further comprising a temperature sensor connected to said controller through a first one of said signal inputs and a humidity sensor connected to said controller through a second one of said signal inputs, at least one of said temperature sensor and said humidity sensor providing said sensed input signals.

2. The apparatus of claim 1 wherein the first power input is connected to the local solar array.

3. The apparatus of claim 2 wherein a second one of said plurality of light indicators indicates a status of said local solar array.

4. The apparatus of claim 3 wherein the power output is connected to said fan.

5. The apparatus of claim 4 wherein a first one of said plurality of switches selects a Celsius or Fahrenheit temperature scale for said display unit.

6. The apparatus of claim 5 wherein a second one of said plurality of switches is configured to allow a user to select a radio frequency channel.

7. The apparatus of claim 4 wherein the second power input is connected to the local public utility AC power supply, said local public utility AC power supply comprising an electrical outlet.

8. The apparatus of claim 7 wherein a third one of said plurality of light indicators indicates a status of said local AC power supply.

9. A method of providing power to an attic exhaust fan comprising:
   receiving power from a power source, the power source including at least two different local sources of power;
   sensing a local temperature with a temperature sensor proximal the attic exhaust fan;
   displaying said local temperature on a display;
   sensing a local humidity with a humidity sensor proximal the attic exhaust fan;
   displaying said local humidity on said display;
   operating the attic exhaust fan from the power source based on said local temperature and said local humidity;
   lighting a fan indicator to indicate said fan is being controlled; and
   lighting one or more indicators to indicate which of the at least two different local sources of power is being used,
   wherein operating the attic exhaust fan step comprises
      using a first one of the at least two different local sources of power as a default if sufficient power for operating the fan is provided by the first one of the at least two different local sources of power, and when using the first one of the at least two different local sources of power operating the fan continuously, wherein the first one of the at least two different local sources of power includes a local solar panel; and
      using a second one of the at least two different local sources of power if sufficient power for operating the fan is not provided by the first one of the at least two different local sources, and when using the second one of the at least two different local sources of power operating the fan for a predetermined duty cycle and for a total period not to exceed a predetermined duration, wherein the second one of the at least two different local sources of power includes a local public utility AC power supply.

10. The method of claim 9 wherein the second one of the at least two different local sources of power includes an electrical outlet.

11. The method of claim 10 further comprising checking a speed of said fan, and turning said fan off if said speed of said fan is not within a pre-specified range.

12. The method of claim 10 further comprising measuring a power consumed by said fan, and turning said fan off if said power consumed by said fan is not within a pre-specified range.

13. The method of claim 12 further comprising communicating to a remote control unit said local temperature and said local humidity when a user presses a status button.

14. The method of claim 13 further comprising communicating to said remote control unit said local power source selected from the group consisting of said solar panel, said electrical outlet, said solar panel and said electrical outlet, and not said solar panel and not said electrical outlet.

15. A system for controlling an attic exhaust fan comprising:
   a controller having:
      a temperature sensor,
      a humidity sensor,
      the temperature sensor and the humidity sensor located proximal the attic exhaust fan,
      a first power input for connecting to a local solar array,
      a second power input for connecting to a local public utility AC power supply, and
      a power output connected to the attic exhaust fan;
   a remote control configured for wireless communications of control information and status information with the controller;
   wherein the controller is configured to operate the attic exhaust fan based on a sensed temperature and a sensed humidity, or based on a sensed humidity; and
   wherein when operating the attic exhaust fan, the controller is configured to determine if sufficient power to operate the fan is available from the first power input and:
      if it is determined that power is available from the first power input, the controller provides power to the power output from the first power input to operate the fan continuously; and
      if it is determined that sufficient power for operating the attic exhaust fan is not available from the first power input, the controller provides power from the second power input to the power output to operate the attic exhaust fan for a predetermined duty cycle and for a total period of time not to exceed a predetermined duration.

16. The system of claim 15, wherein the remote control is configured to set a controller mode such that if it is determined that power is available from the first power input, then power is provided to the power output to turn the fan on dependent only on a sensed humidity and not temperature.

17. The system of claim 15, wherein the system includes a fan connected to the power output, a local solar array connected to the first power input and a local public utility AC power supply comprising a power adapter connected to an electrical outlet.

18. The system of claim 15, wherein the remote control is configured to allow the user to select between two options for the controller's operating mode, including: (1) turning the fan on dependent only on the sensed humidity and (2) turning the fan on dependent on the sensed humidity and the sensed temperature.

19. The apparatus of claim 1, the sensed input signals include a sensed humidity signal and a sensed temperature signal, wherein the controller provides power to the power output from the first and second power inputs if at least one of the sensed humidity signal or sensed temperature signal indicates that a sensed humidity or a sensed temperature exceeds a corresponding preset threshold.

* * * * *